(12) United States Patent
Smith

(10) Patent No.: US 8,204,907 B1
(45) Date of Patent: Jun. 19, 2012

(54) SYSTEMS AND METHODS FOR COLLECTING FILE ACCESS HISTORY INFORMATION

(75) Inventor: Spencer Smith, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 525 days.

(21) Appl. No.: 12/268,253

(22) Filed: Nov. 10, 2008

(51) Int. Cl.
*G06F 17/30* (2006.01)
(52) U.S. Cl. .......................... 707/783; 707/705
(58) Field of Classification Search .................. 707/783, 707/705
See application file for complete search history.

(56) References Cited

U.S. PATENT DOCUMENTS

| | | | |
|---|---|---|---|
| 6,195,447 B1 * | 2/2001 | Ross | 382/125 |
| 6,728,964 B1 * | 4/2004 | Butt | 707/999.008 |
| 6,928,425 B2 * | 8/2005 | Grefenstette et al. | 707/783 |
| 7,823,145 B1 * | 10/2010 | Le et al. | 717/168 |
| 2005/0193188 A1 * | 9/2005 | Huang | 713/1 |
| 2005/0234858 A1 * | 10/2005 | Torii et al. | 707/1 |
| 2006/0010128 A1 * | 1/2006 | Suzuki | 707/5 |
| 2007/0079084 A1 * | 4/2007 | Kobara | 711/154 |
| 2008/0306900 A1 * | 12/2008 | Tamura | 707/1 |
| 2009/0106836 A1 * | 4/2009 | Toshima et al. | 726/22 |
| 2009/0319478 A1 * | 12/2009 | Proux et al. | 707/7 |

* cited by examiner

*Primary Examiner* — Rehana Perveen
*Assistant Examiner* — Tiffany Thuy Bui
(74) *Attorney, Agent, or Firm* — Holland & Hart LLP

(57) ABSTRACT

A method for managing file access history information is described. An application opening a file is identified. Access rights used to open the file are determined. A time parameter associated with the opening of the file is recorded. An access frequency parameter for the file over a predetermined period of time is calculated. File access history information associated with the file is stored.

16 Claims, 7 Drawing Sheets

SYSTEMS AND METHODS FOR COLLECTING FILE ACCESS HISTORY INFORMATION

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems are used to carry out several business, industry, and academic endeavors. For example, computer systems are used to complete transactions, store data, provide information, etc.

Data used by a computer system may be organized into a computer file. The data may be represented as a collection of binary digits that represent integer values, text characters, etc. A computer program may access a computer file, interpret the contents of the file, and present the contents to a user as more meaningful information (text, images, sounds, etc.).

The number of computer files that may be stored in a given computer system may be extremely large. Techniques may be used to organize the large quantity of computer files. The files (or links to the files) may be located in directories. For example, a directory may include either a list of files or a list of links to files. These lists may be organized according to the name of a file, the type of a file, the size of a file, etc.

Computer systems may also take precautions to prevent a malicious computer file from being activated (i.e., opened). The activation of a malicious file may damage or destroy other data, files, etc. stored in the computer system. Computer systems may analyze certain characteristics associated with a computer file in order to determine if the file is a malicious file. As such, benefits may be realized by providing improved systems and methods for monitoring computer files. In particular, benefits may be realized by providing improved systems and methods for monitoring and collecting file access history information associated with a file.

SUMMARY

According to at least one embodiment, a method for managing file access history information is described. An application opening a file may be identified. Access rights used to open the file may be determined. A time parameter associated with the opening of the file may be recorded. An access frequency parameter for the file over a predetermined period of time may be calculated. File access history information associated with the file may be stored.

In one embodiment, the file access history information may be provided to a real time scanning engine. In addition, the file access history information may be provided to a heuristic engine. In one configuration, the file access history information associated with the file may be displayed.

In one embodiment, the length of time since the initiation of a boot operation may be recorded. Further, the length of time since the completion of a boot operation may also be recorded. In a further embodiment, the absolute time when the file is opened may be recorded.

In one example, file access history information associated with a file or a group of files that meet a predetermined criteria may be provided. In one embodiment, access rights used to open the file may include a read access right and a write access right.

A computer system that is configured to manage file access history information is also described. The computer system may include a processor and memory in electronic communication with the processor. The computer system may also include a file monitoring module. The module may be configured to identify an application opening a file and determine access rights used to open the file. In addition, the file monitoring module may be configured to record a time parameter associated with the opening of the file and calculate an access frequency parameter for the file over a predetermined period of time. Further, the file monitoring module may be configured to store file access history information associated with the file.

A computer-program product for managing file access history information is also described. The computer-program product may include a computer-readable medium having instructions thereon. The instructions may include code programmed to identify an application opening a file and code programmed to determine access rights used to open the file. In addition, the instructions may include code programmed to record a time parameter associated with the opening of the file and code programmed to calculate an access frequency parameter for the file over a predetermined period of time. Further, the instructions may include code programmed to store file access history information associated with the file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
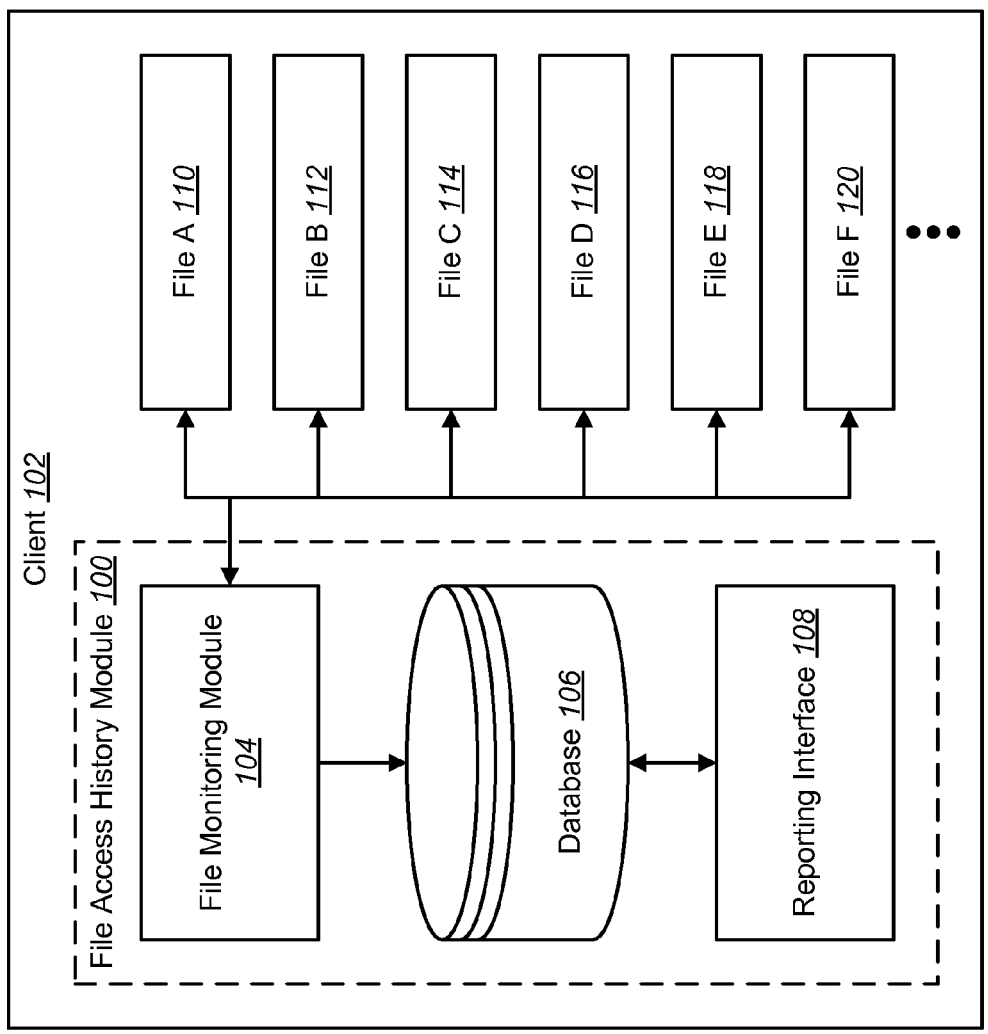
FIG. 1 is a block diagram illustrating one embodiment of a client computing device.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Various operating systems implemented in a computing system may make information about the recent history of a computer file readily available. For example, the recent history information may indicate the last time a file was accessed, the last time the file was modified, etc. However, information about usage patterns for a file over an extended period of time is not typically available nor is information about the application(s) that have accessed the file.

Computer systems may include real time scanning engines that scan files stored within the computer system. Scanning engines may scan files that are accessed during a boot up operation or a shutdown operation for the computer system. In prior systems, in order for scanning engines to determine which files are accessed during the boot up operation or shutdown operation, real time scanning engines have simply scanned every file that is accessed until the scanning engine is notified that the boot up sequence or the shutdown sequence is complete.

Scanning files during either the boot up operation or the shutdown operation may cause the computer system to function at suboptimal speed and efficiency. In one embodiment, access history information of a file may be provided to a scanning engine to improve the efficiency of scanning the file. As such, the present systems and methods to provide access history information of a file to external clients, such as a scanning engine, may improve the performance of the computer system.

FIG. 1 is a block diagram illustrating one embodiment of a client 102. The client 102 may be a computing device, such as a laptop, personal digital assistant (PDA), hand-held computer, desktop computer, super-computer, or any other type of computing device. In one embodiment, the client 102 includes a file access history module 100. The client 102 may also include one or more files 110-120. While six files are illustrated in FIG. 1 as being stored in the client 102, the client 102 may store more or less files. The files 110-120 may be computer files, which may be accessed (or opened) by a computer program or application.

In one embodiment, the file access history module 100 may include a file monitoring module 104, a database 106, and a reporting interface 108. The file monitoring module 104 may monitor each of the files 110-120 stored within the client 102. In one embodiment, the file monitoring module 104 monitors events associated with the opening of a file. For example, an application may access file A 110 and the filing monitoring module 104 may monitor events associated with the opening of file A 110 by the application.

In one embodiment, the filing monitoring module 104 stores the events relating to the opening of a file in the database 106. The reporting interface 108 may access the events associated with the opening of a file from the database 106. The events may be provided to one or more external clients, such as a scanning engine, a heuristic system, a reporting system, etc. Details surrounding the events monitored and provided by the file access history module 100 will be described below.

Figure 2:
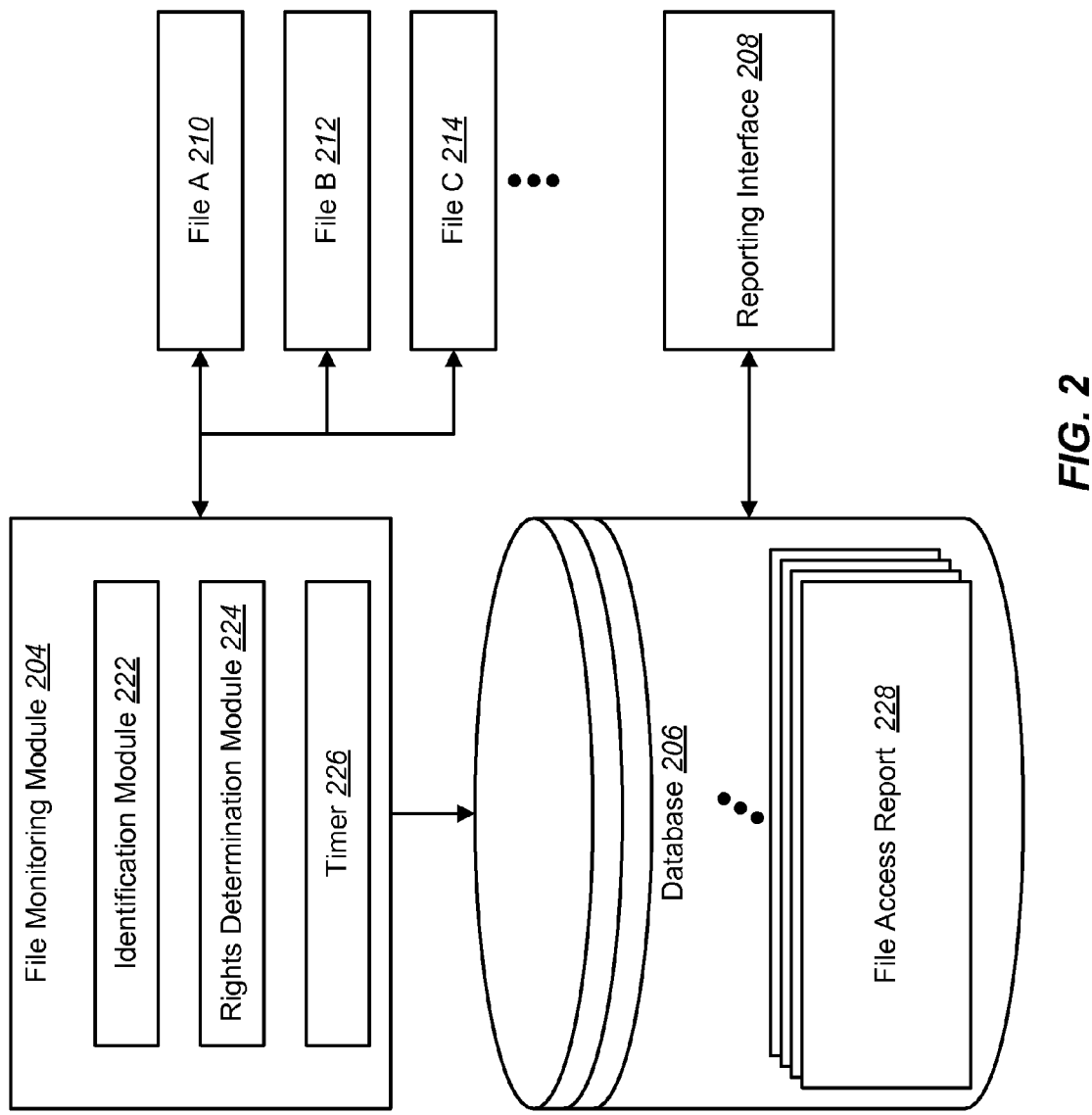
FIG. 2 is a block diagram illustrating one embodiment of a file monitoring module monitoring one or more files.

FIG. 2 is a block diagram illustrating a further embodiment of a file monitoring module 204 that monitors one or more files 210-214. The file monitoring module 204 may include an identification module 222, a rights determination module 224, and a timer 226. In one configuration, the identification module 222 may identify a file that is being opened. In addition, the identification module 222 may identify an application opening the file. For example, the identification module 222 may identify the file and application by a name, type, etc. In one embodiment, the rights determination module 224 may determine which access rights are used to open the file. Examples of access rights may include a read access right, a write access right, or both a read/write access right.

In one embodiment, the timer 226 may calculate a time parameter associated with the opening of the file. For example, the timer 226 may calculate the length of time the client 102 has been operational when a file is accessed. In other words, the timer 226 may calculate the length of time from when the client 102 completed a boot up sequence to when the file is accessed. In a further embodiment, the timer 226 may determine a real time parameter that indicates when the file is opened.

Further, the timer 226 may determine an access frequency associated with a file (or group of files) over a pre-determined period of time. For example, the timer 226 may determine how often a file (such as file B 212) has been accessed over a period of time. In addition, the timer 226 may determine how often a group of files (such as file A 210, file B 212, and file C 214) have been accessed over a predetermined period of time.

The information collected by the identification module 222, the rights determination module 224 and the timer 226 may collectively be referred to as access history information. The access history information associated with a file that is acquired by the file monitoring module 204 may be stored in a database 206 as a file access report 228. The database 206 may store multiple file access reports 228 where each report 228 is associated with a particular file. In one embodiment, a reporting interface 208 may access the file access report 228 stored in the database 206. The reporting interface 208 may facilitate external clients to view the file access report 228 associated with a file.

Figure 3:
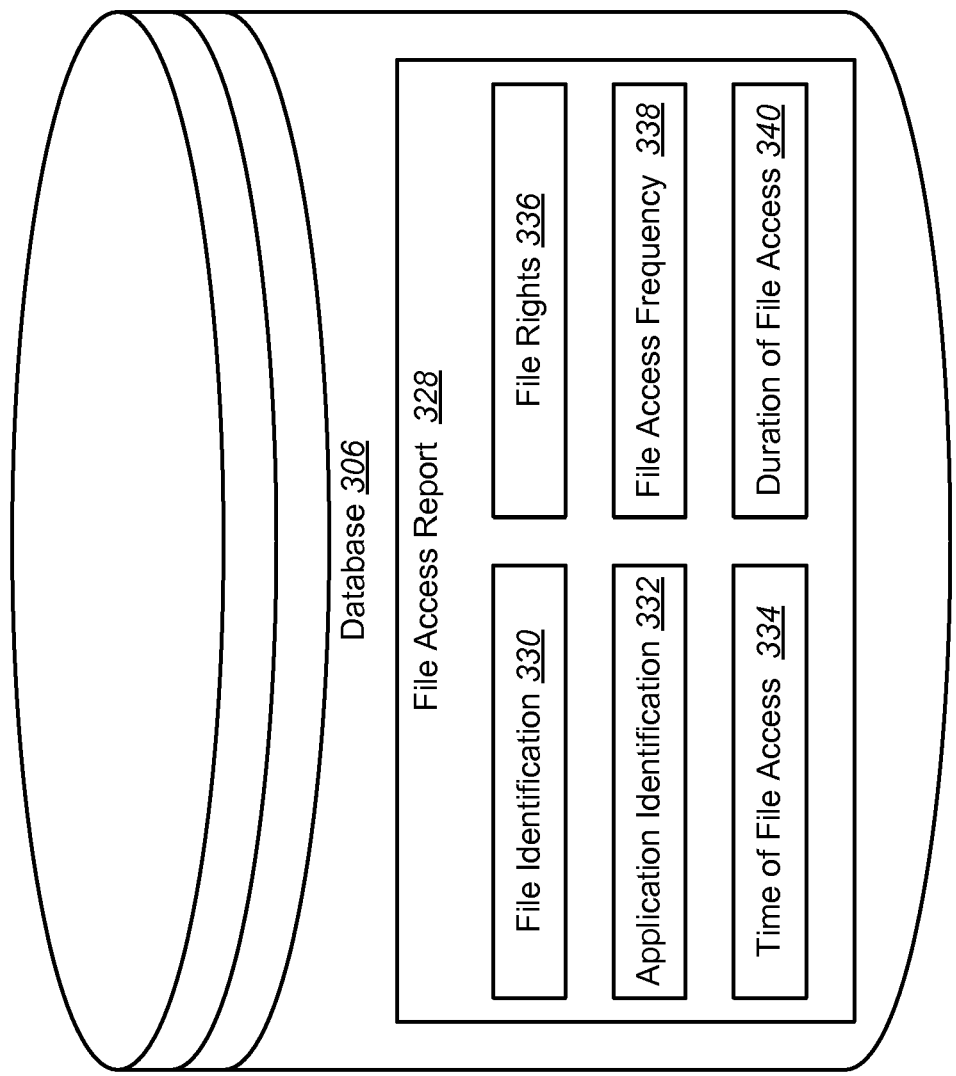
FIG. 3 is one embodiment of a file access report stored in a database.

FIG. 3 is one embodiment of a file access report 328 stored in a database 306. In one configuration, the file access report 328 includes a file identification 330 and an application identification 332. The file identification 330 may be the identification of a particular file stored within a client. For example, the file identification 330 may be a file name, a file type, etc.

In one embodiment, the application identification 332 may be the identification of an application or program that has opened the file identified by the file identification 330. The application identification 332 may be the name of an application, a type of application, etc. In one embodiment, the file identification 330 and the application identification 332 may be acquired by the identification module 222 previously described.

The file access report 328 may also include a time of file access 334 and file rights information 336. In one embodiment, the time of file access 334 may be a time parameter that indicates when a file was accessed. Further, the time of file access 334 may indicate how long a client 102 has been booted up before a file is accessed.

In one embodiment, the file rights information 336 may indicate the access rights that were used to open, or access, a file. For example, the file rights information 336 may indicate a read access, a write access, or both a read/write access.

The file access report 328 may further include file access frequency information 338 and duration of file access information 340. In one embodiment, the file access frequency information 338 may indicate how often a file has been accessed over a pre-determined period of time. In addition, the file access frequency information 338 may also indicate how often a particular application or program has accessed a file over a period of time. The duration of file access information 340 may be a parameter that indicates the length of time a file is accessed, or opened.

As illustrated in FIG. 3, the file access report 328 may be stored within a database 306. The database 306 may store a file access report 328 for each file stored in a client 102 that has been accessed or opened.

Figure 4:
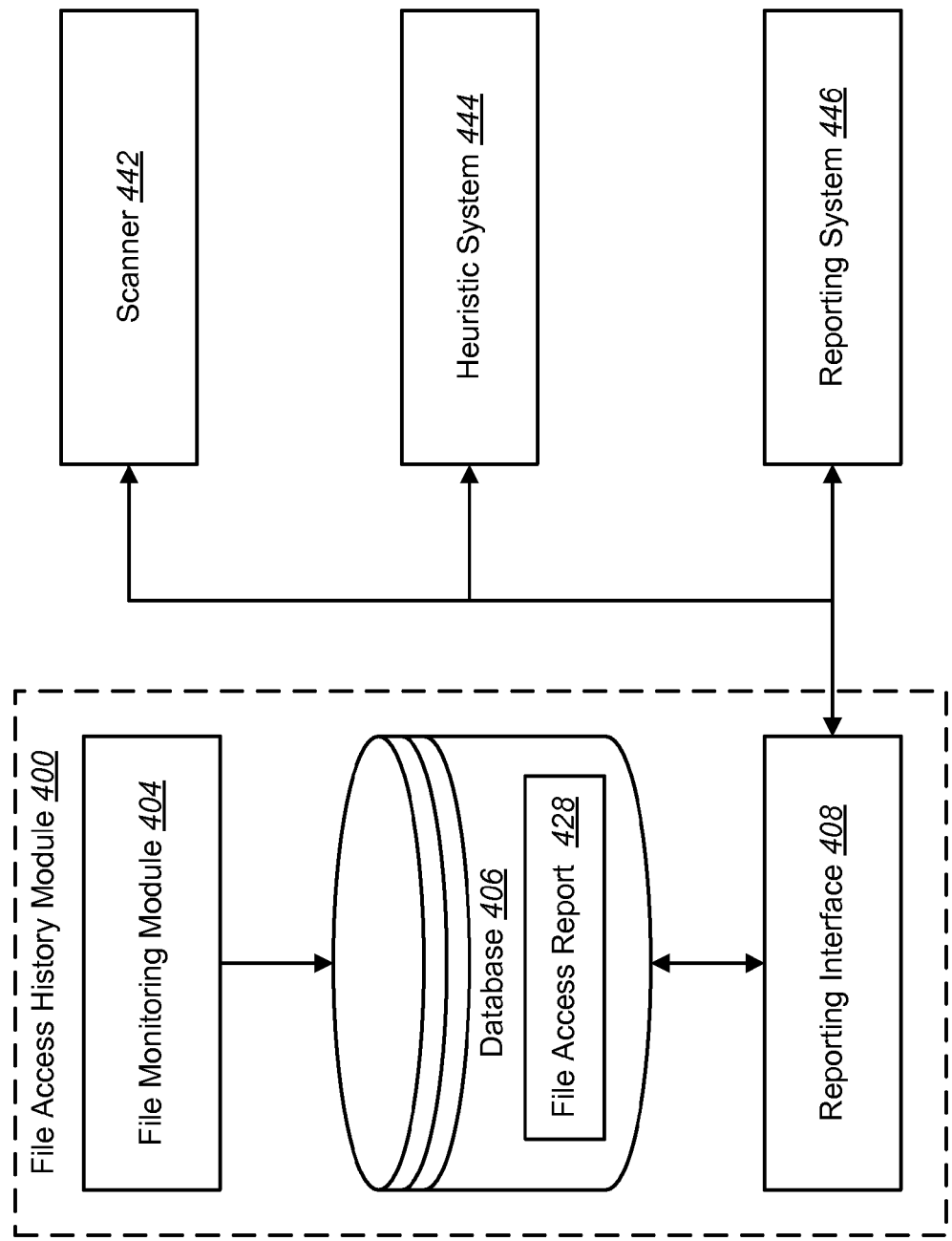
FIG. 4 is a block diagram illustrating one embodiment of external components receiving information regarding the access history of a file.

FIG. 4 is a block diagram illustrating one embodiment of external clients receiving file access history information for a file. In one embodiment, a scanner 442 may receive a file access report 428 through a reporting interface 408 of a file access history module 400. The scanner 442 may be a real time scanning engine that scans files that are accessed during a boot up operation. The scanner 442 may analyze the file access report 428 for a particular file to determine whether the file has been accessed during the boot up operation. If the file has been accessed during previous boot up operations, the scanning engine 442 may pre-scan the file when the client 102 is in an idle time. If the file is pre-scanned, the scanning engine 442 may skip the scanning of the file during the next boot up operation. Reducing the number of files scanned during the boot up operation may improve the speed and efficiency of the client 102.

In one embodiment, following a boot up operation, the scanner 442 may request a list of all files accessed during the boot up operation in order to ensure that those files are pre-scanned so that boot time scans of those files may be skipped. The list of files that are accessed during the boot up operation may be generated from file access reports for the files. For example, the scanner 442 may send the request to the reporting interface 408, which accesses the file access reports 428 stored in the database 406. The reporting interface 408 may analyze the file access reports 428 to determine which files have been accessed during the boot up operation. The reporting interface 408 may provide the list of all files accessed during the boot up operation to the scanner 442. In another embodiment, the scanner 442 may request file access reports 428 directly from the database 406.

The heuristic system 444 may use information in file access reports 428 in order to determine which files have been accessed for a significant period of time without being implicated in malicious activity. For example, the heuristic system 444 may analyze file access reports 428 through the reporting interface 408 in order to determine which files do not need to be analyzed in the future because they have been accessed, or opened, for a pre-determined period of time. Reducing the number of files analyzed by the heuristic system 444 may improve the speed and efficiency of the client 102. In one embodiment, the heuristic system 444 may query the database 406 directly for the file access reports 428.

In addition, a reporting system 446 may receive file access reports 428 through the reporting interface 408 and display information about a specific file or groups of files. The information displayed by the reporting system 446 may be made available, either through a new user interface or by expending an existing mechanism available in the operating system of the client. For example, on a Windows™ operating system, an Explorer extension may be used as the reporting system 446 that provides a tab with additional information about the history of a file and its usage patterns. The reporting system 446 may also submit information to a back-end server, which could provide analysts with information about file usage patterns, such as file access history information (e.g., 40% of files accessed during the boot sequence are PE files, media files are typically only accessed once a week, etc.). In one embodiment, the reporting system 446 may query the database 406 directly from the file access reports 428.

Figure 5:
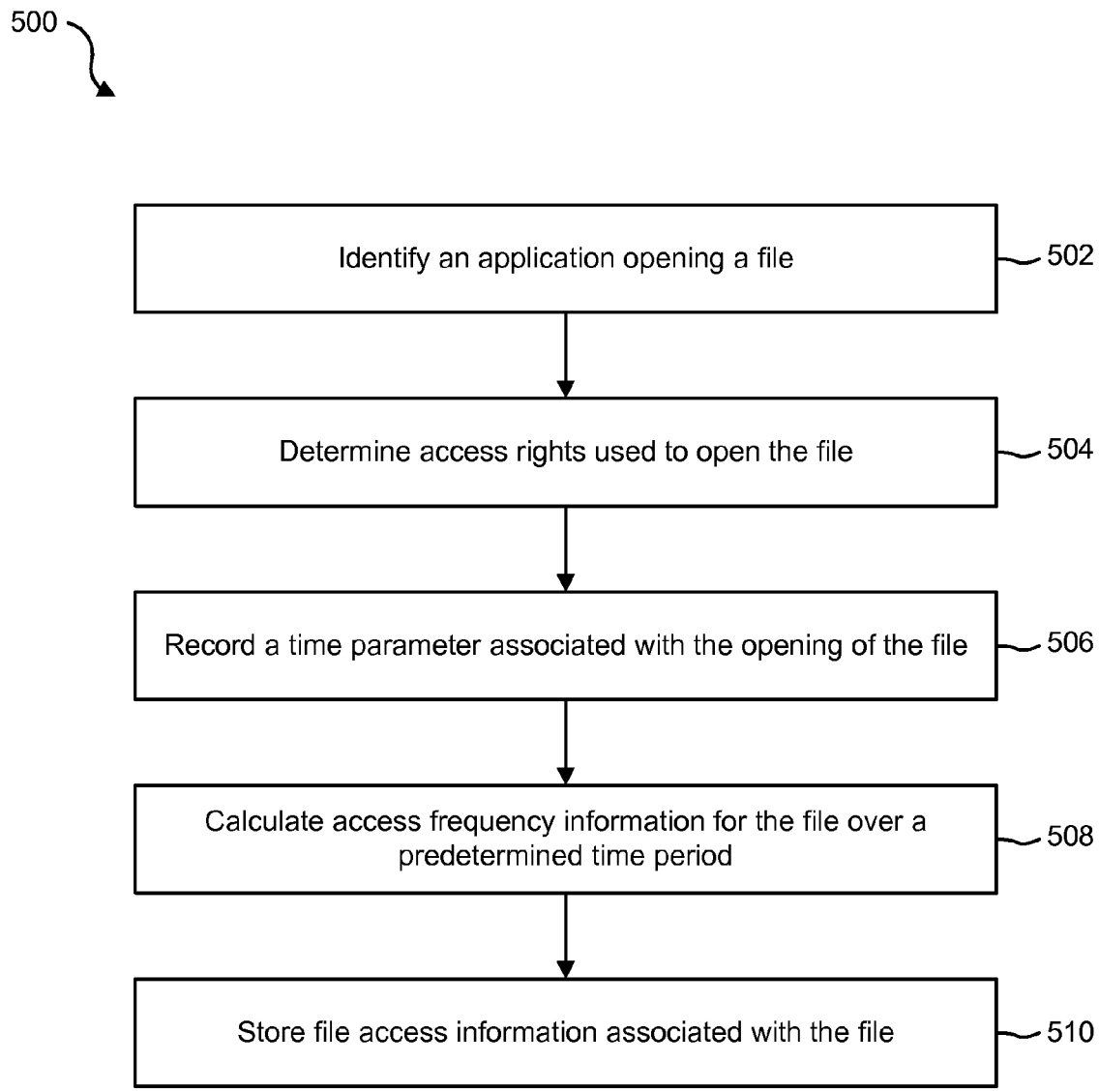
FIG. 5 is a flow diagram illustration one embodiment of a method for collecting file access history information for a file.

FIG. 5 is a flow diagram illustrating one embodiment of a method for collecting file access history information for a file. In one embodiment, the method 500 may be implemented by the file access history module 100.

In one configuration, an application opening a file may be identified 502. The application may be identified 502, by the identification module 222 included in the file monitoring module 204. Access rights used to open the file may be determined 504. As previously explained, the access rights may be a read access and/or a write access. In addition, a time parameter associated with the opening of the file may be recorded 506. The time parameter may indicate the length of time the client 102 has been booted up when the file is opened. Further, the time parameter may indicate the absolute real time that the file was opened.

In one embodiment, access frequency information for the file over a pre-determined time period may be calculated 508. The access frequency information may indicate how often the file has been opened over the pre-determined period of time. The access frequency information may also indicate which application has accessed the file the most over the pre-determined period of time. The information relating to the opening of the file described above may be collectively referred to as the file access information. In one embodiment, the file access information associated with the opening of the file may be stored 510. The file access information may be stored 510 in the database 106. In one embodiment, the file access information may be stored 510 as a file access report 228.

Figure 6:
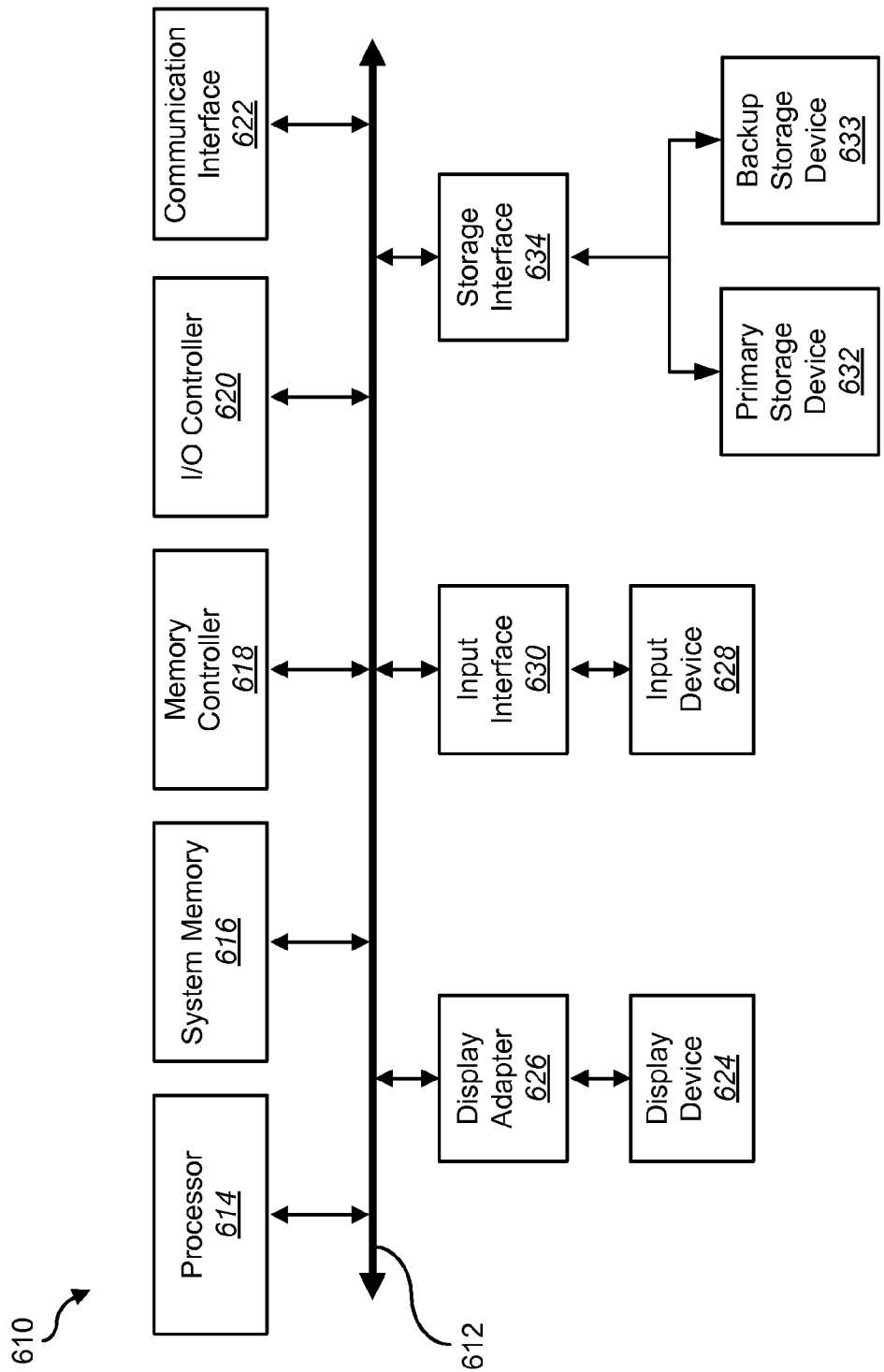
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, determining, recording, calculating, and storing steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6 computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, determining, recording, calculating, and storing.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for identifying, determining, recording, calculating, and storing steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, determining, recording, calculating, and storing steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, determining, recording, calculating, and storing steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Storage devices 632 and 633 may also be used, for example, to perform and/or be a means for performing, either alone or in combination with other elements, one or more of the identifying, determining, recording, calculating, and storing steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
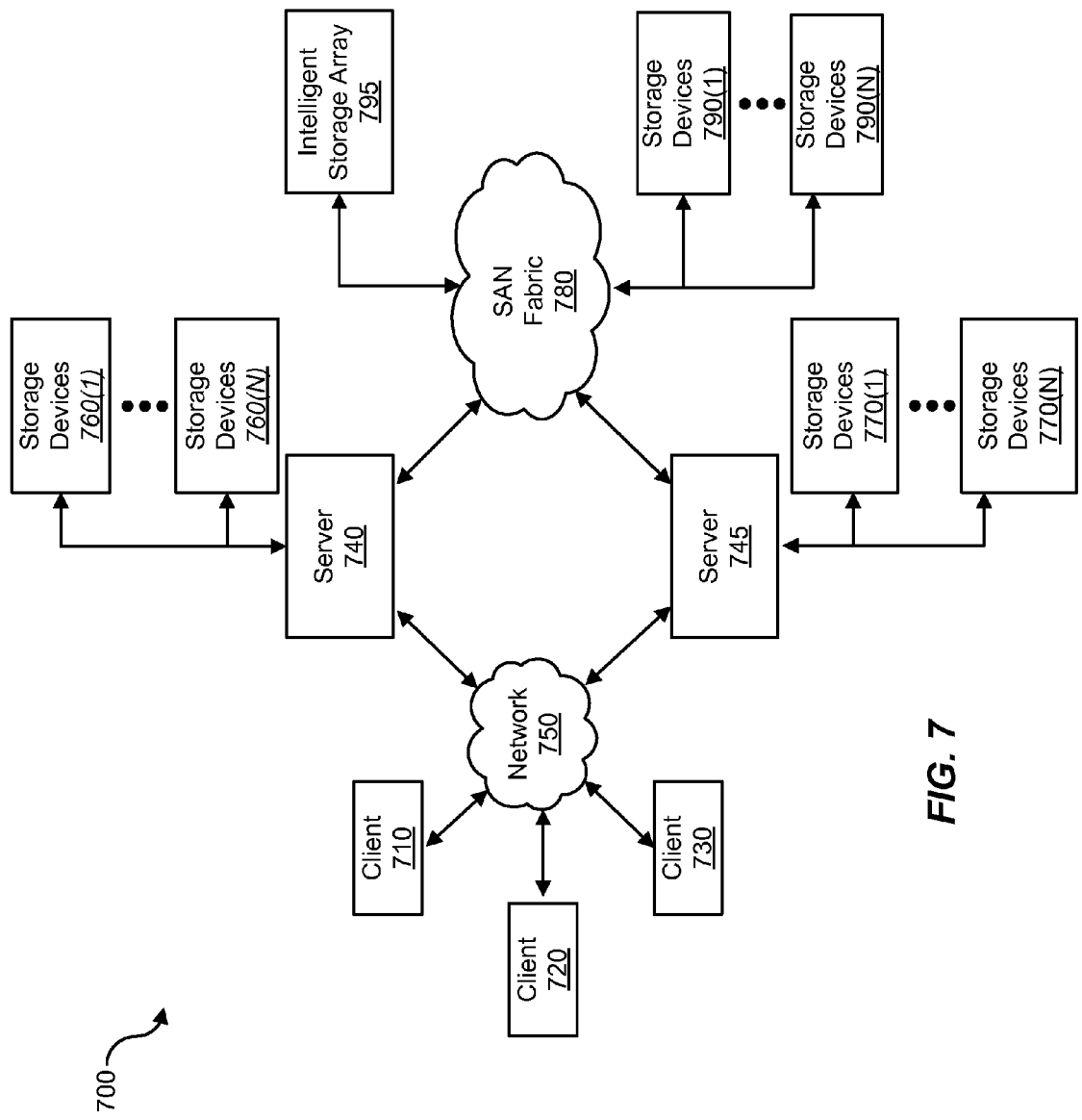
FIG. 7 is a block diagram of an exemplary network architecture in which client systems and servers may be coupled to a network.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, determining, recording, calculating, and storing steps disclosed herein. Network architecture 700 may also be used to perform and/or be a means for performing other steps and features set forth in the instant disclosure.

As detailed above, computing system 610 and/or one or more of the components of network architecture 700 may perform and/or be a means for performing, either alone or in combination with other elements, one or more steps of the exemplary methods described and/or illustrated herein. For example, computing system 610 and/or one or more of the components of network architecture 700 may perform and/or be a means for performing a computer-implemented method for managing file access history information that may comprise: 1) identifying an application opening a file, 2) determining access rights used to open the file, 3) recording a time parameter associated with the opening of the file, 4) calculating an access frequency parameter for the file over a predetermined period of time, and then 5) storing file access history information associated with the file.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method for managing file access history information, the method comprising:
   identifying an application opening a file;
   determining access rights used to open the file;
   recording a time parameter associated with the opening of the file;
   determining, using the time parameter, whether the file was opened during a previous booting sequence of a computing device;
   upon determining that the file was opened during the previous booting sequence, marking the file to be scanned during an idle mode of a computing device and bypassing scanning of the file during a subsequent booting sequence of the computing device;
   calculating an access frequency parameter for the file over a predetermined period of time;
   storing file access history information associated with the file; and
   providing the file access history information to a real time scanning engine and a heuristic engine.

2. The method of claim 1, further comprising displaying the file access history information associated with the file.

3. The method of claim 1, wherein recording the time parameter comprises recording the length of time since the initiation of the booting sequence.

4. The method of claim 1, wherein recording the time parameter comprises recording the length of time since the completion of the booting sequence.

5. The method of claim 1, wherein recording the time parameter comprises recording the absolute time when the file is opened.

6. The method of claim 1, further comprising providing file access history information associated with a file or a group of files that meet a predetermined criteria.

7. The method of claim 1, wherein the access rights used to open the file comprise a read access right.

8. The method of claim 1, wherein the access rights used to open the file comprise a write access right.

9. A computer system that is configured to manage file access history information, the computer system comprising:
   a processor;
   memory in electronic communication with the processor; and
   a file monitoring module, the module configured to:
      identify an application opening a file;
      determine access rights used to open the file;
      record a time parameter associated with the opening of the file;
      determine, using the time parameter, whether the file was opened during a previous booting sequence of the computer system;
      upon determining that the file was opened during the previous booting sequence, mark the file to be scanned during an idle mode of the computing system and bypass scanning of the file during a subsequent booting sequence of the computing device;
      calculate an access frequency parameter for the file over a predetermined period of time;
      store file access history information associated with the file; and
      provide the file access history information to a real time scanning engine and a heuristic engine.

10. The computer system of claim 9, wherein the reporting interface is further configured to provide the file access history information to a reporting system.

11. The computer system of claim 10, wherein the reporting system is configured to display the file access history information associated with the file.

12. The computer system of claim 9, wherein the time parameter comprises the length of time since the initiation of the booting sequence for the computer system.

13. The computer system of claim 9, wherein the time parameter comprises the length of time since the completion of the booting sequence for the computer system.

14. The computer system of claim 9, wherein the time parameter comprises the absolute time when the file is opened.

15. A computer-program product for managing file access history information, the computer-program product comprising a non-transitory computer-readable medium having instructions thereon, the instructions comprising:
   code programmed to identify an application opening a file;
   code programmed to determine access rights used to open the file;
   code programmed to record a time parameter associated with the opening of the file;

code programmed to determine, using the time parameter, whether the file was opened during a previous booting sequence of a computing device;

upon determining that the file was opened during the previous booting sequence, code programmed to mark the file to be scanned during an idle mode of a computing device and bypass scanning procedures of the file during a subsequent booting sequence of the computing device;

code programmed to calculate an access frequency parameter for the file over a predetermined period of time;

code programmed to store file access history information associated with the file; and code programmed to provide the file access history information to a real time scanning engine and a heuristic engine.

16. The computer-program product of claim 15, wherein the instructions further comprise code programmed to provide the file access history information to a reporting system.

* * * * *